United States Patent
Jeon

(10) Patent No.: US 9,902,377 B2
(45) Date of Patent: Feb. 27, 2018

(54) METHOD FOR CONTROLLING BRAKING FORCE OF BRAKE ACCORDING TO VELOCITY

(71) Applicant: Hyundai Motor Company, Seoul (KR)

(72) Inventor: Gab Bae Jeon, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/566,067

(22) Filed: Dec. 10, 2014

(65) Prior Publication Data
US 2015/0321649 A1 Nov. 12, 2015

(30) Foreign Application Priority Data

May 8, 2014 (KR) .................. 10-2014-0054511

(51) Int. Cl.
| | |
|---|---|
| B60T 7/12 | (2006.01) |
| B60T 8/32 | (2006.01) |
| B60T 7/04 | (2006.01) |
| B60T 8/58 | (2006.01) |
| B60T 13/66 | (2006.01) |
| B60T 8/00 | (2006.01) |

(52) U.S. Cl.
CPC .............. B60T 7/12 (2013.01); B60T 7/042 (2013.01); B60T 8/3275 (2013.01); B60T 8/58 (2013.01); B60T 13/662 (2013.01); B60T 8/00 (2013.01); B60T 2201/03 (2013.01)

(58) Field of Classification Search
None
See application file for complete search history.

(56) References Cited

U.S. PATENT DOCUMENTS

2001/0027367 A1* 10/2001 Maruko .................. B60T 7/22
701/70

FOREIGN PATENT DOCUMENTS

| JP | 08-040240 A | 2/1996 |
|---|---|---|
| JP | 2000-6783 A | 1/2000 |
| JP | 2007-38794 A | 2/2007 |
| KR | 10-1993-0007741 A | 5/1993 |
| KR | 10-03787490000 B1 | 3/2003 |
| KR | 10-2004-0053663 A | 6/2004 |
| KR | 10-2004-0085639 A | 10/2004 |

* cited by examiner

*Primary Examiner* — Rami Khatib
*Assistant Examiner* — Gerrad A Foster
(74) *Attorney, Agent, or Firm* — Morgan, Lewis & Bockius LLP

(57) ABSTRACT

A method for controlling braking force of brake may include step of controlling braking force for each vehicle speed period to make braking force different in accordance with vehicle speed period by increasing an early hydraulic pressure of brake system for obtaining braking force in low-speed period to be lower than in middle-speed period, by increasing hydraulic pressure in middle-speed period to be higher than in low-speed period but to be lower than in high-speed period, and by increasing hydraulic pressure in high-speed period to be higher than in middle-speed period, and step of controlling braking force for each vehicle speed which sets correction coefficient α that is function of vehicle speed while braking to make braking force different for each vehicle speed, and brakes vehicle with braking force according to current vehicle speed determined using set correction coefficient α, wherein braking force is controlled by one of steps.

11 Claims, 8 Drawing Sheets

METHOD FOR CONTROLLING BRAKING FORCE OF BRAKE ACCORDING TO VELOCITY

CROSS-REFERENCE TO RELATED APPLICATION

The present application claims priority to Korean Patent Application No. 10-2014-0054511 filed on May 8, 2014, the entire contents of which is incorporated herein for all purposes by this reference.

BACKGROUND OF THE INVENTION

Field of the Invention

The present invention relates to a method for controlling a braking force of a brake according to velocity. More particularly, it relates to a method for controlling a braking force according to velocity, which can improve initial braking ability while braking, when a vehicle is driven both at a high speed and a low speed using different hydraulic maps in braking at a low speed and braking at a high speed of the vehicle.

Description of Related Art

When a vehicle being running is braked, a braking force is generated by matching hydraulic force on the basis of a pedal stroke and the braking force depends on a pedal ratio, the specifications of a booster and a master cylinder, the size of a caliper piston size, an effective braking radius of a disc, the friction coefficient of a friction member, the tire size, etc.

A simulator is used for reproduction of the behavior of a pedal to develop a brake-by-wire type of brake system and the braking force of the brake system is obtained by generating hydraulic pressure with a device that generates and controls hydraulic pressure on the basis of a map set by developers.

According to the standards for developing such a brake system, "stroke vs braking force" and "pedal effort vs braking force", etc. are mapped to achieve a braking ability similar to those of vehicles actually equipped with the braking system.

The "stroke vs braking force" is obtained by mapping hydraulic pressure to ensure a braking ability, as shown in FIG. 1A, and the "stroke vs braking force" is obtained by mapping hydraulic pressure to ensure a braking ability, as shown in FIG. 1B.

It has been known that early deceleration has much influence on braking ability, and the part corresponding to jump-in force of a brake for good early deceleration can be achieved by mapping hydraulic pressure.

Drivers feel that braking response is improved and the braking ability increases when the early deceleration is increased, but when the early deceleration is too large, drivers may feel uncomfortable because they feel like the vehicle is suddenly braked, and the difference in feeing of deceleration in braking is associated with the vehicle speed at the beginning of braking.

That is, it feels like braking response is good, rather than it is sudden braking, even if the initial braking force is large at a high vehicle speed, but it feels like sudden braking, even under the same initial braking force, when a vehicle is braked at a low speed.

However, there is a problem in that when the hydraulic pressure for braking is too high, it feels like the braking force is too large in braking at a low speed (feels like sudden braking), and when the hydraulic pressure decreases to prevent it, it feels as if the initial braking force is small while braking at a low speed (feels as if early deceleration is delayed).

It is impossible to solve the problem unless the parts of a brake system are changed, so the initial braking force has been set around a middle level through trade-off at an adequate level.

On the other hand, since there is a BAS (Brake Assist System) function, it is possible to rapidly increase a braking force up to the level when an ABS operates, in rapid braking under an emergency while a vehicle runs, but a driver cannot adjust the braking force within the range of braking force at the level before the ABS operates. Further, since deceleration close to the level when the ABS operates is very large deceleration, there may be a possibility of a collision with the vehicle behind.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for controlling a braking force of a brake according to velocity which can provide a satisfactory initial braking ability in braking at both of high-speed and low-speed running by generating different initial braking forces for each of vehicle speeds or vehicle speed periods in conjunction with a vehicle speed at the beginning of braking, in a brake system capable of changing a braking force of a vehicle by setting a tuning map.

Another object of the present invention is to achieve smooth braking following driver's intention by generating a greater braking force in an emergency situation when a driver operates the brake pedal fast than in a normal braking situation.

In one aspect, the present invention provides a method for controlling a braking force of a brake according to a velocity, which includes: a step of controlling a braking force for each vehicle speed period to make a braking force different in accordance with the vehicle speed period by increasing an initial hydraulic pressure of a brake system for obtaining a braking force to be lower in a low-speed period than in a middle-speed period, by increasing the hydraulic pressure to be higher in the middle-speed period than in the low-speed period but to be lower than in a high-speed period, and by increasing the hydraulic pressure in a high-speed period to be higher than in the middle-speed period; and a step of controlling a braking force for each vehicle speed which sets a correction coefficient α that is a function of a vehicle speed while braking in order to make a braking force different for each vehicle speed, and brakes a vehicle with the braking force F according to a current speed calculated using the set correction coefficient α, in which the a braking force is controlled by the steps.

The method further includes a step of controlling a braking force according to a pedal operation speed to increase a braking force by increasing an early hydraulic pressure of a brake system for obtaining a braking force to be higher than the hydraulic pressure at a reference operation speed, when a pedal operation speed of a brake pedal pressed down is over the reference speed, especially in the steps of controlling a braking force for each vehicle speed period and of controlling a braking force for each vehicle speed.

The present invention provides the following effects from the embodiments.

First, it is possible to improve a braking ability that a drive feels in braking both at a high speed and a low sped, by appropriately controlling a braking force in accordance with a vehicle speed, for example, by generating a different braking force foe each vehicle speed or each vehicle speed period.

Second, it is possible to generate a safe braking force even under an emergency, which requires a large braking force, by increasing the entire braking force by driver's intention, so it is possible to prevent a collision with a vehicle behind and to improve safety in driving.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the invention are discussed infra.

Figure 1A:
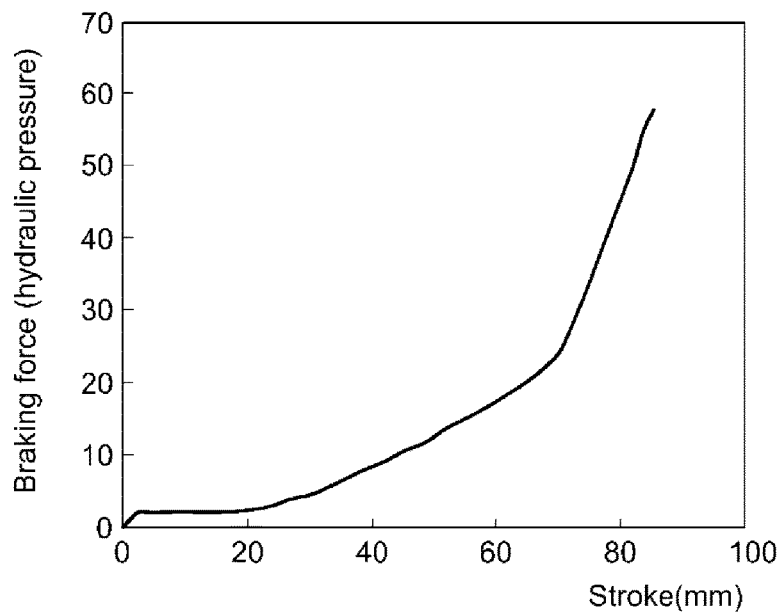
FIG. 1A and FIG. 1B are graphs showing examples of mapping ill now be described in detail with reference to certain exemplary embodiment.
Figure 1B:
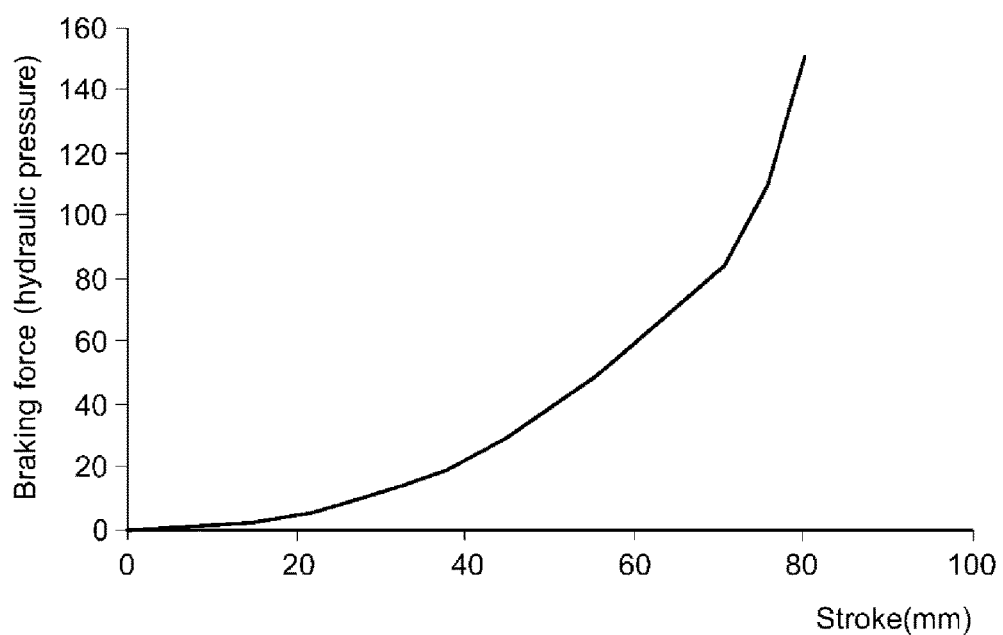

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

According to the present invention, it is possible to set hydraulic pressure for obtaining a braking force different by controlling it with a controller in a brake-by-wire type of brake system, so it is possible to improve an initial braking ability in braking at both of a low speed and a high speed by making a hydraulic pressure map different in low-speed braking and high-sped braking. Further, when a pedal stroke speed of a brake pedal pressed down by a driver is over a standard speed, it is possible to provide a braking force that coincides with driver's intention by additionally increasing a braking force.

Embodiments of the present invention for achieving these objects will be described hereafter in detail with reference to the accompanying drawings.

First Embodiment

The first embodiment of the present invention is to provide a process of controlling a braking force for each vehicle speed period, which controls a braking force to be different in accordance with vehicle speed periods, when a vehicle is running.

To this end, a period is set for each vehicle speed.

That is, the vehicle speed periods are divided into a low-speed period (0 kph~A kph), a middle-speed period (A kph~B kph), and a high-speed period (B kph or more) and the vehicle speeds that are the standards for dividing the vehicle speed periods can be changed.

For example, the low-speed period may be 0 kph~30 kph, the middle-speed period may be 30 kph~80 kph, and the high-speed period may be 80 kph or more and a braking force is set to be different in accordance with the vehicle speed periods.

Figure 2A:
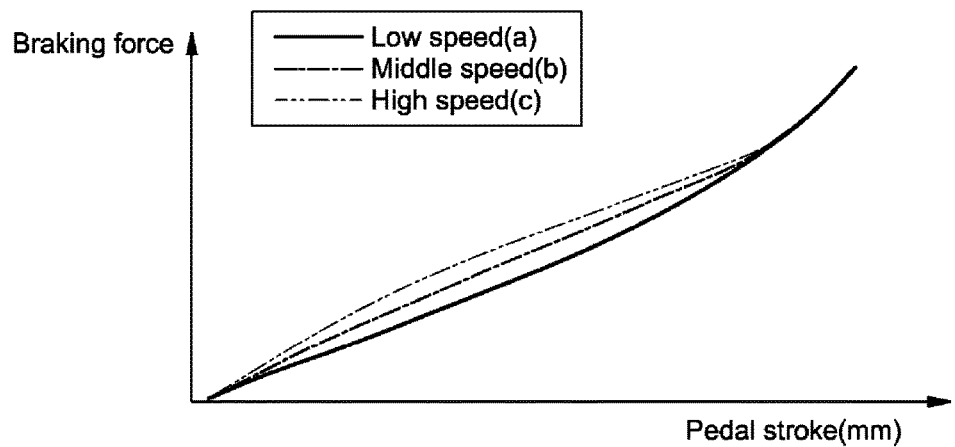
FIG. 2A and FIG. 2B are graphs showing braking control for each of vehicle speed periods according to a various exemplary embodiments of the present invention.
Figure 2B:
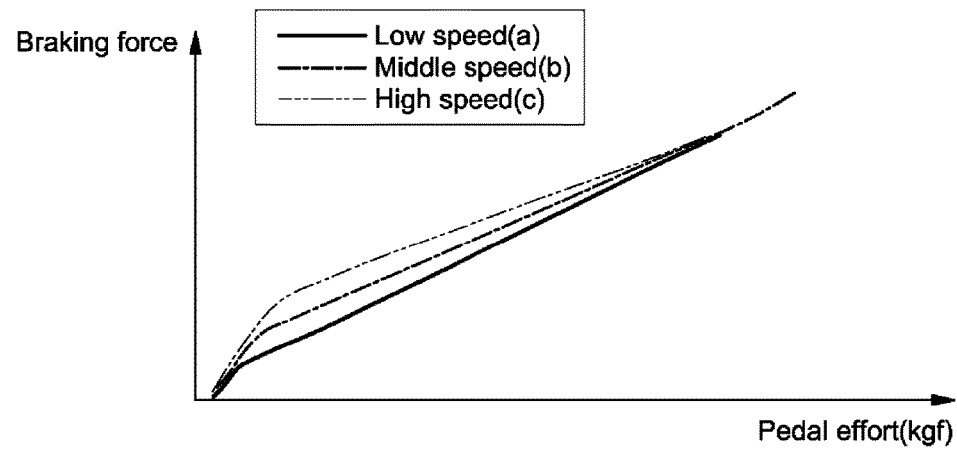

FIG. 2A is a braking force-pedal stroke graph with different braking forces in vehicle speed periods as a first embodiment of the present invention and FIG. 2B is a braking force-pedal effort graph with different braking forces in vehicle speed periods.

In order to make a braking force different in the vehicle speed periods as set above, by increasing the early hydraulic pressure of a brake system to be low in the low-speed period so that the initial braking force is controlled less than that in the middle-speed period (indicated by solid lines in FIGS. 2A and 2B), thereby preventing the feeling of a braking force being too large like occurring with sudden braking due to high hydraulic pressure for braking at a low vehicle speed in the related art, and accordingly, a driver can sense good braking in the low-speed period.

Further, by increasing the early hydraulic pressure of a brake system in the middle-speed period to be higher than in the low-speed period but to be lower than in the high-speed period, the initial braking force is controlled to be higher than that in the low-speed period but to be lower than that in the high-speed period (indicated by one-dashed lines in FIGS. 2A and 2B) so that it is possible to prevent the feeling of a braking force being too large like occurring with sudden braking due to high hydraulic pressure for braking, which is set up to the level for the high-speed period, at a middle vehicle speed in the related art, and accordingly, it is possible to make a driver sense good braking in the middle-speed period.

On the contrary, since it feels as though the braking response is good, rather than it feels as if the braking is too sudden, even if the initial braking force is large, in the high-speed period when the vehicle speed is high, by setting the early hydraulic pressure of a brake system higher in the high-speed period than the hydraulic pressure applied in the middle-speed period, the initial braking force is controlled to be large in the high-speed period (indicated by two-dashed lines in FIGS. 2A and 2B) so that it is possible to make a driver feel the braking response is good in the high-speed period.

The method for controlling a braking force of a brake according to a speed according to the first embodiment of the present invention is described in more detail.

Figure 3:
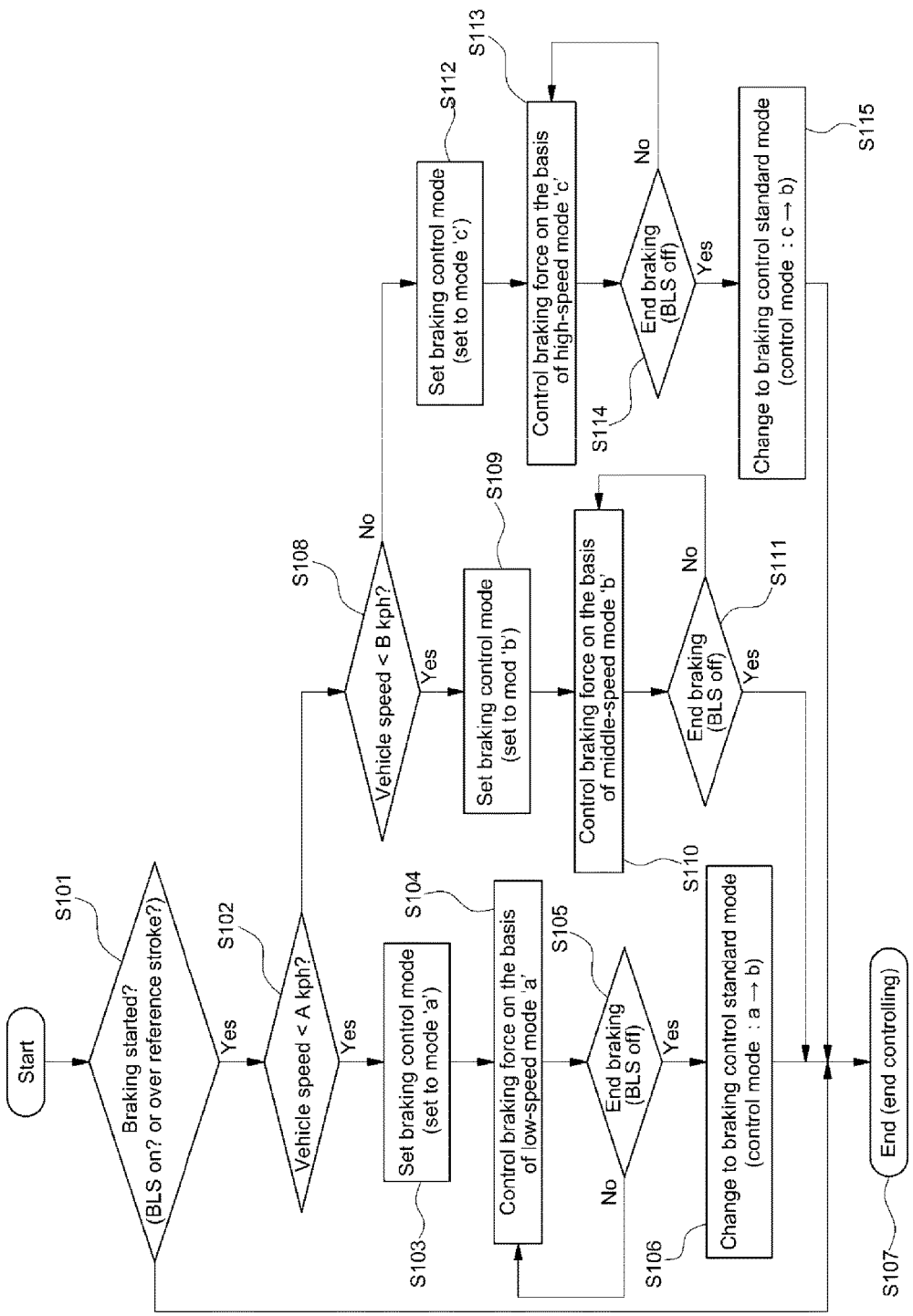
FIG. 3 is a flowchart showing a process of controlling a braking force for each of vehicle speed periods according to the various exemplary embodiments of the present invention.

FIG. 3 is a flowchart showing a method for controlling a braking force of a brake according to a speed according to the first embodiment of the present invention.

First, it is determined whether a vehicle is braked when a vehicle is running is determined (S101).

When a brake lamp switch (BLS) is turned on, or when a brake pedal is pressed down over a standard stroke, it is determined that braking has been started.

The standard stroke is a stroke where the control of a braking force is started, and it is determined that braking has been started, when it is over the standard stroke, and the control of a braking force is started in accordance with a stroke-braking force map.

Next, whether the current vehicle speed belongs to the low-speed period in braking is determined (S102).

When it is determined that the current vehicle speed belongs to the low-speed period (for example, 0 kph~30 kph), a braking control mode is set to a mode 'a' that is a low-speed control mode (S103).

The mode 'a' is a braking control mode at a low speed, which increases the early hydraulic pressure in the low-speed period so that the initial braking force is controlled to be lower than those in the middle-speed and high-speed periods (indicated by solid lines in FIGS. 2A and 2B).

Next, the hydraulic pressure of the brake system is controlled to obtain a braking force on the set mode 'a', so the braking force is controlled in the low-speed period (S104).

As described above, when the vehicle speed belongs to the low-speed period, in braking, it is possible to prevent a feeling as if the braking force is too large like occurring in sudden braking due to high hydraulic pressure for braking at a low speed which is set up to the level at the high-speed period in the related art, by slightly increasing the early hydraulic pressure, so it is possible to make a driver sense good braking in the low-speed period.

Next, when the brake lamp switch is turned off or when the brake pedal is returned, it is determined that braking is forcibly ended (S105).

After the braking is ended, the braking control mode is changed to a basic mode and the basic mode is set to a mode 'b' that is a braking control mode for the middle-speed period (S106).

At this time, the basic mode may be set, other than the mode 'b' that is the braking control mode at a middle speed, to the mode 'a' that is the braking control mode at a low speed or a mode 'c' that is a braking control mode at a high speed, and another basic mode may be additionally provided.

Accordingly, when the braking is ended, the braking control is ended after the braking control mode is changed to the basic mode (S107).

On the other hand, it is determined whether the current vehicle speed belongs to the middle-speed or high-speed period while braking (S108), and when it is determined that the current vehicle speed belongs to the middle-speed period (for example, 30 kph~80 kph), the braking control mode is set to the mode 'b' that is the middle-speed control mode (S109).

The mode 'b' is a braking control mode for a low speed which increases the early hydraulic pressure of a brake system higher than that in the low-speed period, but lower than that in the high-speed section so that the initial braking force is controlled to be higher than that in the low-speed period and lower than that in the high-speed period (indicated by one-dashed lines in FIGS. 2A and 2B).

Next, the hydraulic pressure of the brake system is controlled to obtain a braking force on the set mode 'b', so the braking force is controlled in the middle-speed period (S110).

As described above, when the vehicle speed is in a middle speed while braking, it is possible to prevent the feeling as if a braking force is too large like occurring in sudden braking due to high hydraulic pressure for braking, which is set up to the level applied at the high-speed period, even in the middle-speed period as in the related art, by increasing the early hydraulic pressure to be higher than that in the low-speed period and lower than that in the high-speed period, so it is possible to make a driver feel good braking ability in the middle-speed period.

Next, when the brake lamp switch is turned off or when the brake pedal is returned, it is determined that the braking is ended (S111), and since the braking control mode at a middle speed is set to the basic mode, the braking control is immediately ended (S107).

On the other hand, it is determined whether the current vehicle speed belongs to the middle-speed or high-speed period while braking (S108), and when it is determined that the current vehicle speed belongs to the high-speed period (for example, 80 kph or more), the braking control mode is set to the mode 'c' that is the high-speed control mode (S112).

The mode 'c' is a braking control mode for a high speed which sets the early hydraulic pressure of a brake system over the hydraulic pressure applied in the middle-speed period so that the braking force in the high-speed period is controlled to be large (indicated by two-dashed lines in FIGS. 2A and 2B).

Next, the hydraulic pressure of the brake system is controlled to obtain a braking force by the set mode 'c', so the braking force is controlled in the high-speed period (S113).

As described above, since it feels like the braking response is good, rather than having the feeling of sudden braking, in the high-speed period in which the vehicle speed is high, even if the initial braking force is increased, it is possible to make a driver feel like the braking response is good by setting the early hydraulic pressure of the brake system over the hydraulic pressure applied in the middle-speed period.

Next, when the brake lamp switch is turned off or when the brake pedal is returned, it is determined that the braking is ended (S114), the braking control mode is changed to the middle-speed braking control mode that is the set basic mode (S115), and then the braking control is ended (S107).

On the other hand, one of the low-speed, middle-speed, and high-speed braking control mode may be always set in accordance with the vehicle speed, regardless of whether a vehicle is braked, by performing the step of setting the braking control mode to the low-speed, middle-speed, and high-speed braking control mode, before the step of determining the start of braking (S101), or the braking control mode may be fixed to one of them at the beginning of the braking and the braking control may not be changed, until the braking control is ended.

Second Embodiment

The second embodiment of the present invention is for providing a step of controlling a braking force at each vehicle speed to make the braking force different in accordance with the vehicle speed, when a vehicle runs, and is characterized in that a correction coefficient α that is a function of the vehicle speed while braking is set and the braking is performed with the braking force F according to the current vehicle speed which is calculated using the correction coefficient α, in order to make the braking force different in accordance with the vehicle speed.

Figure 4:
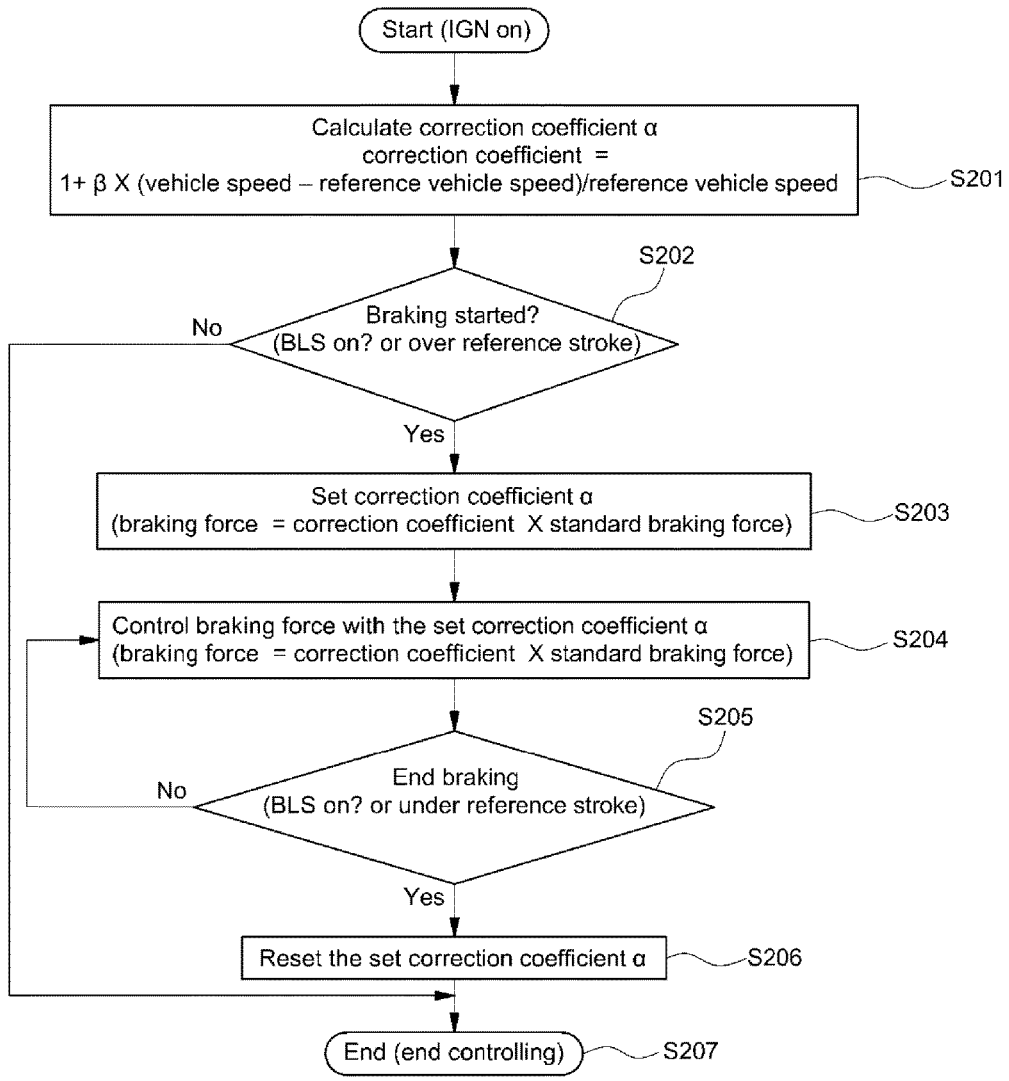
FIG. 4 is a flowchart showing a process of controlling a braking force for each of vehicle speeds according to a various exemplary embodiments of the present invention.

FIG. 4 is a flowchart showing a method for controlling a braking force of a brake according to a velocity according to the second embodiment of the present invention.

First, the correction coefficient α that is a function of the vehicle speed is calculated from the following Equation 1 (S201).

$$\text{correction coefficient } \alpha = 1 + \beta \ast (\text{current vehicle speed} - \text{standard vehicle speed})/\text{standard vehicle speed} \quad \text{Equation 1})$$

In Equation 1) β is a value set for making a braking force different between vehicle speeds, for example, it may be set to 5%, 10%, and 20% etc., and the standard vehicle speed may be freely set, for example, at 60 kph, which is a common running speed.

The correction coefficient α may be calculated in real time when a vehicle runs, or it may be made as mapping data for each vehicle speed from tests.

First, whether braking is started when a vehicle is running is determined (S202).

When a brake lamp switch (BLS) is turned on, or when a brake pedal is pressed down over a standard stroke, it is determined that braking has been started.

Next, the correction coefficient α calculated in the way described above is set to control the braking force and it is set to a fixed value when braking is started (S203).

When the correction coefficient α is set, the braking force at the current vehicle speed becomes "correction coefficient*basic braking force" and the basic braking force is obtained from a pedal stroke/pedal effort vs braking force map at the basic vehicle speed.

Next, the braking is controlled on the basis of the set correction coefficient α by "correction coefficient*basic braking force" that is the braking force at the current vehicle speed (S204).

For example, when the current vehicle speed is input to a low speed (for example, under the standard vehicle speed) in Equation 1, the correction coefficient is set as a low value, so the braking force at the current speed (correction coefficient*basic braking force) is also low, whereas when the current vehicle speed is input to a high speed (for example, over the standard vehicle speed), the correction coefficient is set as a high value, so the braking force at the current vehicle speed (correction coefficient*basic braking force) is also high, and accordingly, the braking force is controlled such that the lower the vehicle speed, the smaller the braking force, and the higher the vehicle speed, the larger the braking force.

Next, when the brake lamp switch is turned off or when the brake pedal is returned, it is determined that the braking control is ended (S205), the set correction coefficient is reset (S206), and then the braking control is ended (S207).

The reason that the fixed (set) correction coefficient is reset after the braking control is ended is for setting another correction coefficient for the braking force control at the next vehicle speed in which the correction coefficient is calculated again or extracted again from the mapping data.

As described above, since it is possible to apply different braking forces for each vehicle speed, by reducing the braking force with a decrease in vehicle speed and increasing the braking force with an increase in vehicle speed, it is possible to prevent the feeling of having a braking force which is too large, as occurs in sudden braking, by setting the hydraulic pressure for braking to be high, as in the related art, when the vehicle speed is low, whereas it is possible to make a driver feel the braking response is good in the high-speed period.

On the other hand, the step (S201) of calculating the correction coefficient α that is a function of the vehicle speed may be performed after the step of determining start of braking (S202).

The braking force control map of a controller that controls a braking force for each vehicle speed period or each vehicle speed, as in the first embodiment and the second embodiment, is set on the basis of a "pedal stroke vs braking force" or "pedal effort vs braking force" of a vehicle where a common brake system is applied.

Further, when the braking control map is set, the initial braking force can be differentiated.

In more detail, it is possible to make the level of braking force different for each vehicle speed or each vehicle speed period in a predetermined deceleration period (variable as a set deceleration speed within about 0.2 g) and the level can be set from actual braking estimation for each vehicle speed and each vehicle speed period, such as to 3%, 4%, 5%, etc.

Figure 5A:
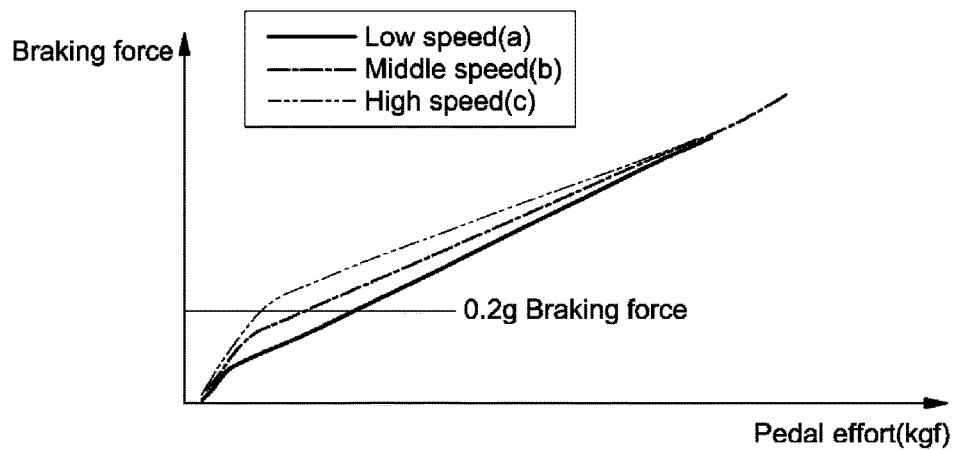
FIG. 5A and FIG. 5B are graphs showing a method of differentiating an initial braking force in the processes of controlling a braking force according to the first and various exemplary embodiments of the present invention.
Figure 5B:
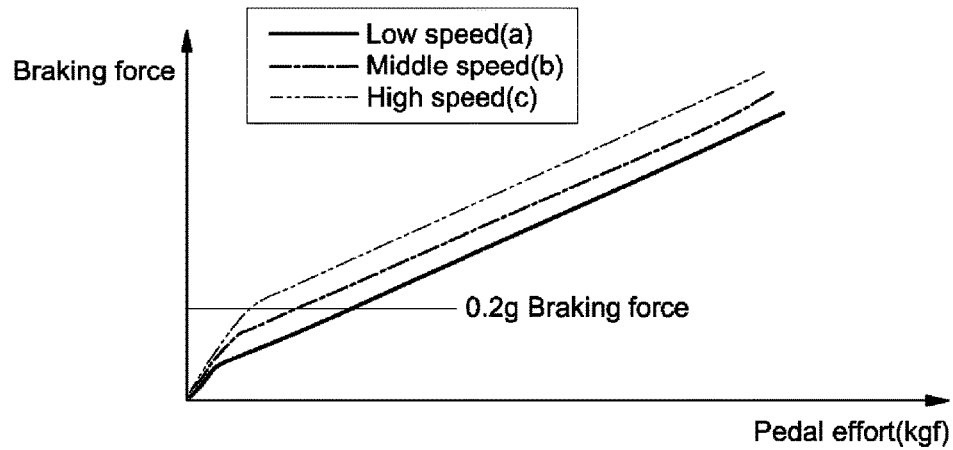

For example, as shown in FIG. 5A, it is possible to make the initial braking force (deceleration) different for each vehicle speed or each vehicle speed period and then to control deceleration at a predetermined level after a predetermined deceleration period, and as shown in FIG. 5B, it is possible to make the initial braking force different for each vehicle speed or each vehicle speed period and then to keep the different levels, until braking is ended, thereby maintaining high braking force level.

Third Embodiment

The third embodiment of the present invention is characterized by further performing a step of controlling a braking force according to a pedal operation speed to increase a braking force by increasing the early hydraulic pressure of a brake system for obtaining a braking force to be higher than a reference speed, when the stroke speed of a brake pedal pressed down is over the reference speed, in the step of controlling a braking force for each vehicle speed period according to the first embodiment and in the step of controlling a braking force for each vehicle speed according to the second embodiment.

Figure 6A:
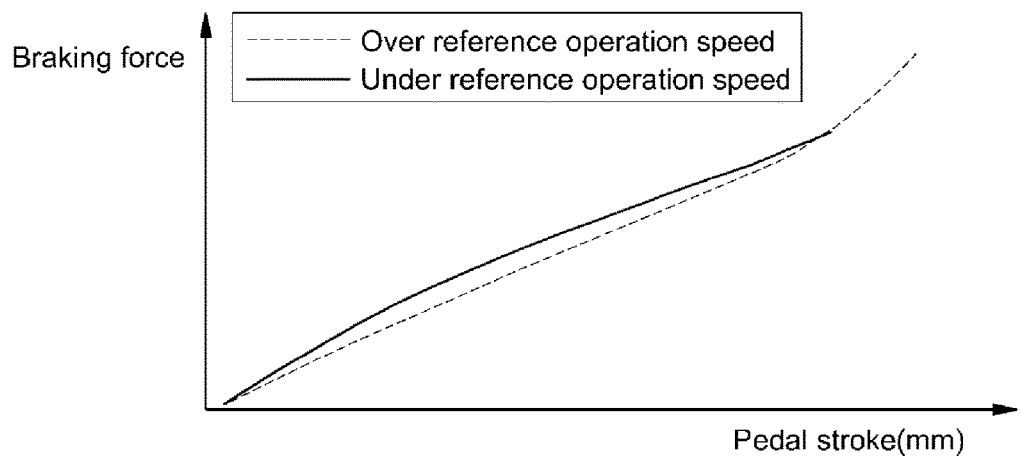
FIG. 6A and FIG. 6B are graphs showing a method of controlling a braking force, based on a pedal operation speed, according to the various exemplary embodiments of the present invention.
Figure 6B:
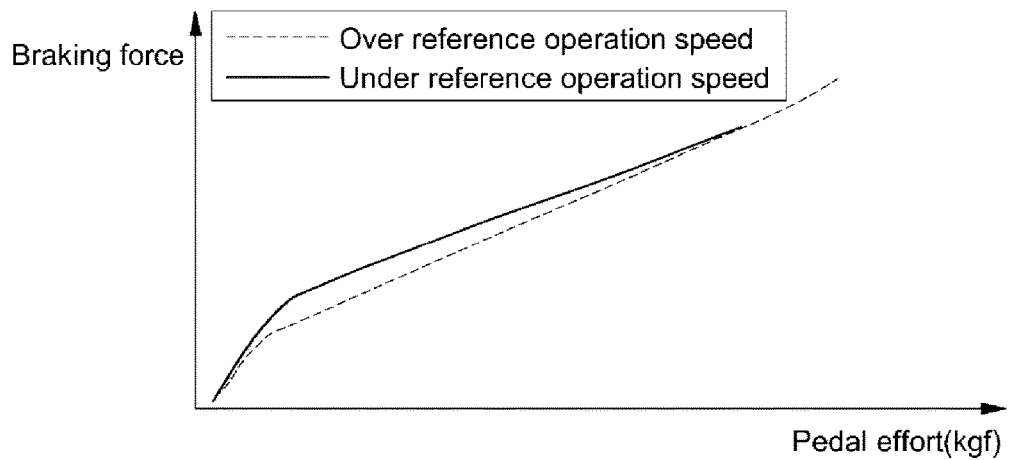

As shown in FIGS. 6A and 6B, when the pedal operation speed is higher than a reference operation speed by braking force control according to the pedal operation speed, it is determined that there is a need for rapid braking, and the entire braking force is largely increased, and when it is under the reference operation speed, a braking force is generated in accordance with standard braking control.

To this end, the reference operation speed to the pedal operation speed, that is, the stroke speed of brake pedal pressed down may be set, for example to 250 mm/sec. The reference operation speed may be adjusted by tuning and is set to be smaller than a pedal operation speed at a level where a BAS function is achieved, and lager than the operation speed in normal braking.

Further, the reference operation speed may be set to be different for each driver, by applying a learning logic for monitoring the operation speed by a driver in normal times.

The step of controlling a braking force depending on the pedal operation speed according to the third embodiment of the present invention is described in more detail as follows.

Figure 7:
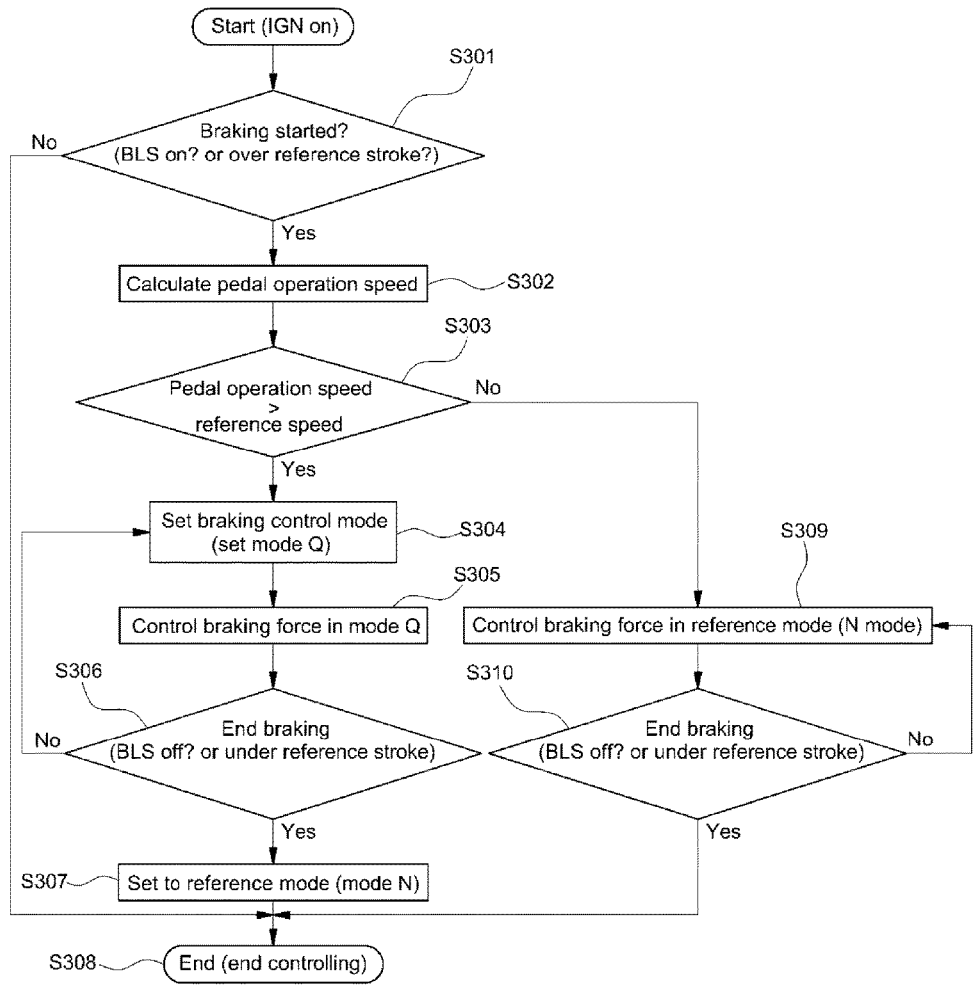
FIG. 7 is a flowchart showing a method of controlling a braking force, based on a pedal operation speed, according to the various exemplary embodiments of the present invention.

FIG. 7 is a flowchart showing a method for controlling a braking force depending on a pedal operation speed according to the third embodiment of the present invention.

First, it is determined whether braking is started when a vehicle is running (S301).

When a brake lamp switch (BLS) is turned on, or when a brake pedal is pressed down over a reference stroke, it is determined that braking has been started.

Next, the pedal operation speed of the brake pedal pressed down by a driver while braking is sensed and calculated (S302).

Next, the pedal operation speed by a driver and a reference operation speed are compared (S303), and then when the pedal operation speed is under the reference operation speed, a braking force is controlled in a reference mode (mode N, indicated by dotted lines in FIGS. 8A and 8B) which applies hydraulic pressure for obtaining a braking force to a brake system in accordance with a reference braking control map like a normal time (S309).

The mode N, that is, a first mode braking control step is a braking control mode when the pedal operation speed is under the previous operation speed.

Next, when the brake lamp switch is turned off or when the brake pedal is returned, it is determined that the braking control is ended (S310), and then the braking control is ended (S308).

In contrast, the pedal operation speed by a driver and the reference operation speed are compared (S303), and when the pedal operation speed is over the reference operation speed, the braking control mode is set to a mode Q (S304).

The mode Q, that is, a second mode braking control step is a braking control mode when the pedal operation speed is over the reference operation mode, and it is a braking control mode that increases a braking force by increasing the hydraulic pressure of a brake system for obtaining a braking force to be higher, as compared with the mode N.

When the pedal operation speed is higher than the reference operation speed, it is determined that there is a need for rapid braking, and braking control according to the mode Q (indicated by thick solid lines in FIGS. 8A and 8B) is performed (S305).

Figure 8A:
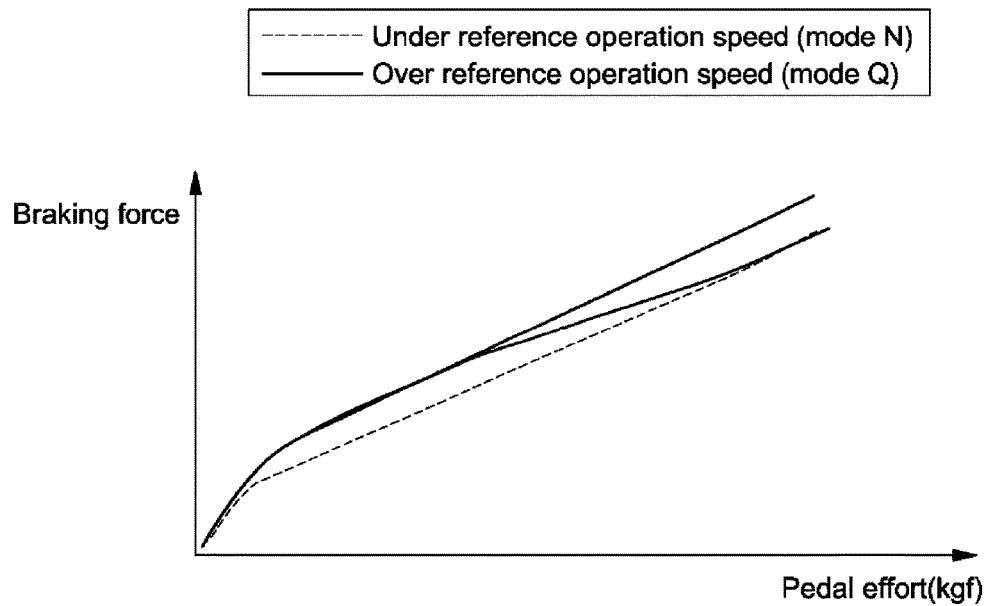
FIGS. 8A and 8B are graphs showing a pattern of controlling a braking force, based on a pedal operation speed, according to the various exemplary embodiments of the present invention.
Figure 8B:
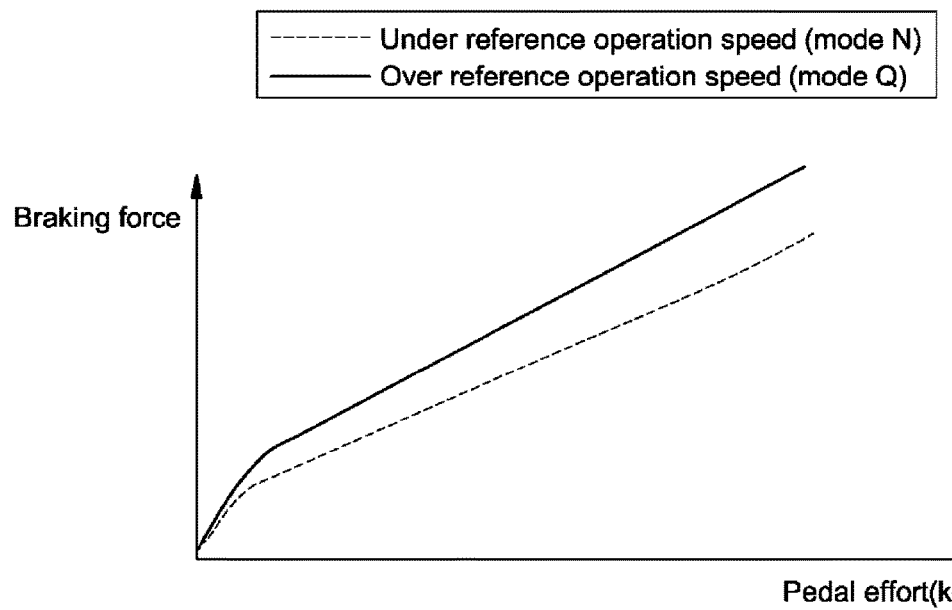

The increasing level of the mode Q to the mode N may be set to 10%, 20%, etc., and as shown in FIG. 8A, it is possible to increase the braking force increase pattern of the mode Q in the early stage and then to change it to the level of the mode N, as it goes close to the point of time when braking is finished, and as shown in FIG. 8B, it is possible to gradually increase the braking force increase pattern of the mode Q from the early stage to the end of braking, that is, it is possible to variously set the braking force increase pattern of the mode Q.

Accordingly, in an emergency requiring a large braking force (for example, a braking force at a level lower than when an ABS operates), the entire braking force is increased by the braking force control in the mode Q, and thus, a safe braking force can be achieved in an emergency and a driver can adjust the braking force.

Next, when the brake lamp switch is turned off or when the brake pedal is returned, it is determined that the braking control is ended (S306), the braking control mode is set back to the mode N that is the reference mode (S307), and then the braking control is ended (S308).

Even though hydraulic pressure is described to obtain the braking force, it is obvious that any other means such as EMB, pneumatic pressure or the like can be applied to obtain the braking force.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:
1. A method for controlling a braking force of a brake system according to a vehicle speed, the method comprising:
    a step of controlling a braking force for each vehicle speed which sets a correction coefficient ($\alpha$) that is a function of the vehicle speed while braking to make a braking force different for each vehicle speed, and brakes a vehicle with the braking force according to a current vehicle speed determined using the set correction coefficient (α), wherein the step of controlling the braking force for the each vehicle speed includes:
- a step of determining, by a controller, the correction coefficient (α) that is a function of the vehicle speed;
- a step of determining, by the controller, a start of braking;
- a step of setting, by the controller, the determined correction coefficient (α) to a fixed value to control the braking force while braking;
- a step of determining, by the controller, the braking force in accordance with "set correction coefficient (α)*standard braking force"; and
- a step of generating the determined brake force by operating the brake system, wherein the correction coefficient (α) is determined by an equation: "the correction coefficient (α)=[1+β*(current vehicle speed−reference vehicle speed)/the reference vehicle speed]", in which β is a value set for making a braking force between vehicle speeds different.

2. The method of claim 1, wherein the step of controlling the braking force for the each vehicle speed further comprising:
- a step of controlling, by the controller, a braking force according to a brake pedal operation speed of a brake pedal wherein the braking force is controlled to be increased in accordance with "the set correction coefficient (α)*the standard braking force" by increasing a hydraulic pressure of the brake system for obtaining a braking force to be higher than a hydraulic pressure at a reference brake pedal operation speed, when the brake pedal operation speed of the brake pedal pressed down is over the reference brake pedal operation speed.

3. The method of claim 2, wherein the step of controlling the braking force according to the brake pedal operation speed includes:
- a step of sensing and determining the brake pedal operation speed of the brake pedal pressed down while braking;
- a first mode braking control step of applying a hydraulic pressure for obtaining a braking force to the brake system in accordance with "the set correction coefficient (α)*the standard braking force", when the brake pedal operation speed is lower than the reference brake pedal operation speed; and
- a second mode braking control step of increasing the braking force by increasing the early hydraulic pressure of the brake system, when the brake pedal operation speed is over the reference brake pedal operation speed.

4. The method of claim 3, wherein the reference brake pedal operation speed is adjusted by tuning.

5. The method of claim 3, wherein the reference brake pedal operation speed is set to be different for each driver by applying a learning logic for monitoring operation speeds of the drivers.

6. The method of claim 3, wherein a braking increase pattern by the second mode braking control step is increased at a predetermined stage of braking and is changed to a level of the first mode braking control step, as it goes closer to a point of time when braking is finished.

7. The method of claim 3, wherein a braking increase pattern by the second mode braking control step is increased to a point of time when braking is ended from a predetermined stage of braking.

8. The method of claim 1, further comprising a step of resetting the set correction coefficient, after the braking control is ended.

9. The method of claim 1, wherein the step of determining the correction coefficient (α) is performed after the step of determining the start of braking.

10. The method of claim 1, wherein the step of controlling the braking force for the each vehicle speed, further comprising:
- a step of making an initial braking force different for the each vehicle speed during a predetermined deceleration period.

11. The method of claim 1, wherein the start of braking is determined by detecting a state of a brake lamp switch or an operation of a brake pedal.

* * * * *